United States Patent
Song et al.

(10) Patent No.: US 10,865,741 B2
(45) Date of Patent: Dec. 15, 2020

(54) ENGINE DRIVE APPARATUS

(71) Applicant: LG ELECTRONICS INC., Seoul (KR)

(72) Inventors: Sungbae Song, Seoul (KR); Taekyung Kim, Seoul (KR); Younggyu Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/518,004

(22) Filed: Jul. 22, 2019

(65) Prior Publication Data

US 2020/0032744 A1  Jan. 30, 2020

(30) Foreign Application Priority Data

Jul. 30, 2018 (KR) .................. 10-2018-0088417

(51) Int. Cl.
| | | |
|---|---|---|
| *F02M 21/04* | (2006.01) | |
| *F02B 33/40* | (2006.01) | |
| *F02M 21/02* | (2006.01) | |
| *F25B 27/00* | (2006.01) | |
| *F02B 39/10* | (2006.01) | |

(Continued)

(52) U.S. Cl.
CPC ............. *F02M 21/04* (2013.01); *F02B 33/32* (2013.01); *F02B 33/40* (2013.01); *F02B 39/10* (2013.01); *F02B 63/06* (2013.01); *F02M 21/0245* (2013.01); *F25B 27/00* (2013.01)

(58) Field of Classification Search
CPC .. F05D 2260/60; F02M 21/04; F02M 21/245; F02B 27/00; F02B 39/16; F02B 39/10; F02B 33/32; F02B 33/40; F02B 63/06; F04D 29/441; F04D 29/668; F04D 29/403

See application file for complete search history.

(56) References Cited

U.S. PATENT DOCUMENTS

| | | | |
|---|---|---|---|
| 6,360,731 B1 * | 3/2002 | Chang ................... | F02B 33/40 123/559.1 |
| 2009/0019852 A1 * | 1/2009 | Inoue .................... | F02B 33/40 60/608 |

(Continued)

FOREIGN PATENT DOCUMENTS

| | | |
|---|---|---|
| EP | 2 924 261 | 9/2015 |
| EP | 3 343 754 | 7/2018 |

(Continued)

OTHER PUBLICATIONS

European Search Report dated Nov. 21, 2019 issued in Application No. 19188300.8.

(Continued)

*Primary Examiner* — George C Jin
(74) *Attorney, Agent, or Firm* — Ked & Associates, LLP (57) ABSTRACT

There is disclosed an engine drive apparatus comprising an engine configured to generate a power by combusting mixed gas of air and gas fuel; a fan assembly arranged in an upstream of the engine and configured to super-charge the mixed gas towards the engine; and a mixer provided in an upstream of the fan assembly and configured to mix the air and the fuel with each other, wherein the fan assembly comprises a motor; and a fan connected with the motor via a shaft to drive, and the air is supplied to the mixer after passing through the motor.

16 Claims, 6 Drawing Sheets

(51) Int. Cl.
    F02B 63/06        (2006.01)
    F02B 33/32        (2006.01)

(56)         References Cited

U.S. PATENT DOCUMENTS

2011/0180036 A1*  7/2011  Chuang ................. F02B 33/40
                                                        123/361
2015/0047617 A1*  2/2015  Benjey .................. F02B 33/38
                                                       123/559.3
2015/0211423 A1*  7/2015  Chuang ................. F02M 26/19
                                                        701/103
2017/0152792 A1*  6/2017  Hornbach ............... F02B 39/10
2017/0204868 A1*  7/2017  Oshita .................. F02B 39/10
2017/0356403 A1* 12/2017  Zhao .................. F02M 25/0222
2018/0306209 A1* 10/2018  Nejedly ................. F04D 25/06

FOREIGN PATENT DOCUMENTS

JP           2624303         6/1997
JP         H11-303790       11/1999
JP        2006-307648       11/2006
JP        2009-228624       10/2009
JP        2013-148062        8/2013
JP       2013148062 A    *   8/2013
KR       10-2008-0068258     7/2008
KR         10-1238922        3/2013
KR       10-2018-0055412     5/2018

OTHER PUBLICATIONS

Korean Office Action dated Jun. 3, 2019 issued in KR Application No. 10-2018-0088417.

* cited by examiner

ENGINE DRIVE APPARATUS

CROSS-REFERENCE TO RELATED APPLICATIONS

This application claims priority to Korean Patent Application No. 10-2018-0088417 filed on Jul. 30, 2018 in Korea, the entire contents of which is hereby incorporated by reference in its entirety.

BACKGROUND OF THE DISCLOSURE

Field of the Disclosure

Embodiments of the present disclosure relate to an engine drive apparatus, more particularly, an engine drive apparatus to which a super-charger is applied to super-charge mixed gas to an engine.

Background of the Disclosure

In general, an engine drive apparatus may mean a drive configured to drive an engine. For example, such an engine drive apparatus may include an engine. A heat pump and an engine generation system may be driven by the engine drive apparatus. In this instance, the engine may provide a power by using the combustion of the mixed gas and fuel.

The heat pump includes a compressor for compressing a refrigerant, an indoor heat exchanger for exchanging heat with indoor air, an expansion valve for expanding a refrigerant, and an outdoor heat exchanger for exchanging heat with outdoor air.

The compressor and the outdoor heat exchanger may be provided in an outdoor unit. The expansion valve and the indoor heat exchanger may be provided in an indoor unit. According to types of electric appliances, the expansion valve may be provided in the outdoor unit. The engine generation system may include a generator driven by the engine.

In other words, the compressor of the heat pump and the generator of the engine generation system may be driven by the power of the engine.

Meanwhile, a conventional engine drive apparatus may facilitate the inflow of the mixed gas into the engine by using a negative pressure inside the engine. Accordingly, the amount of the mixed gas flow supplied to the engine per unit time is restricted disadvantageously.

The restriction of the flow amount of the mixed gas may mean the restriction of the engine output. Therefore, to enhance the engine output, there are ongoing studies and researches for increasing the amount of the mixed gas flow per unit time.

Moreover, if the mixed gas leakages towards the motor configured to drive a fan to super-charge the mixed gas, there is another problem of a fire.

SUMMARY OF THE DISCLOSURE

Accordingly, an object of the present invention is to address the above-noted and other problems and provide an engine drive apparatus which may super-charge mixed gas to an engine.

Another object of the present invention is to provide an engine drive apparatus which may radiate a motor so as to allow the air supplied to a mixer to pass a motor.

A further object of the present invention is to provide an engine drive apparatus which may fundamentally shut off leakage of mixed gas towards a motor.

Embodiments of the present disclosure may provide an engine drive apparatus comprising an engine configured to generate a power by combusting mixed gas of air and gas fuel; a fan assembly arranged in a front end of the engine and configured to super-charge the mixed gas towards the engine; and a mixer provided in a front end of the fan assembly and configured to mix the air and the fuel with each other. The fan assembly may comprise a motor; and a fan connected with the motor via a shaft to drive, and the air is supplied to the mixer after passing through the motor.

At this time, the air supplied to the mixer may be supplied after passing through the motor. Accordingly, the air guided to the mixer may radiate the motor.

The fan assembly may comprise a fan housing provided to accommodate the fan and having an open lower end; and a support bracket configured to support the motor in the upper area of the fan housing, space a preset distance apart from the fan housing.

An inlet hole may be formed in an upper end surface of the fan housing and configured to draw the mixed gas formed by the mixer towards the fan. Accordingly, the flow of the mixed gas towards the motor may be fundamentally prevented.

The support bracket may comprise a motor sheet on which the motor is disposed; a shaft penetrating hole formed in the motor sheet and configured to pass the shaft there through; and a plurality of support frames configured to support the motor sheet in a state of being spaced apart from the inlet hole.

Lower ends of the support frames may be coupled to coupling grooves that are formed in an outer area of an upper surface of the fan housing with respect to a radial direction of the inlet hole, respectively. Accordingly, the inlet hole may be spaced apart from the motor in a vertical direction.

The fan assembly may comprise a diffuser arranged in a lower end of the fan; and a lower bracket arranged under the diffuser to have the diffuser disposed thereon and coupled to a lower end of the fan housing.

An outlet hole configured to discharge the mixed gas pressurized by the fan may be formed in the lower bracket.

The lower bracket may comprise a diffuser coupling portion upwardly projected from a center area to couple the diffuser; a housing coupling portion configured to form a circumference of the lower bracket and coupled to a lower end of the fan housing; and a plurality of ribs radially extended from the diffuser coupling portion towards the housing coupling portion to define the outlet hole.

When the motor is driven, the mixed gas may be drawn via the inlet hole in a direction that becomes farther from the motor, and the mixed gas may be then pressurized by the fan and discharged via the outlet hole. Accordingly, the flow of the mixed gas towards the motor may be fundamentally prevented.

The engine drive apparatus may further comprise an air flow path configured to guide air towards the mixer; a mixed air flow path configured to guide the mixed gas towards the engine; and a flow path forming case comprising a first space in communication with the air flow path; and a second space independent from the first space and in communication with the mixed gas flow path.

At this time, the motor may be arranged in the first space and the fan housing is arranged in the second space. Accordingly, the motor may be radiated by the air and the mixed gas flow path may be partitioned off from the air flow path.

A separation plate may be provided in the flow path forming case and configured to partition off an internal space into the first space provided in an upper space and the second space provided in a lower space, and a support bracket sheet may be provided in the separation plate and a circumference of the support bracket is disposed on the support bracket sheet. Accordingly, the position of the motor and the position of the fan may be stably maintained in the first space and the second space, respectively.

The flow path forming case may comprise first and second side cases configured to define both lateral surfaces; an upper case configured to define some areas of the upper, front and rear surfaces; and a lower case configured to define the other area of the upper, front and rear surfaces.

A first inlet hole corresponding to the first space and a second outlet hole corresponding to the second space may be formed in the first side case. A first outlet hole corresponding to the first space and a first inlet hole corresponding to the second space may be formed in the second side case.

The air flow path may comprise an air inlet channel connected with the first inlet hole; and an air outlet channel connected with the first outlet hole. The mixed gas flow path may comprise a mixed gas inlet channel connected with the second inlet hole; and a mixed gas outlet channel connected with the second outlet hole.

The air inlet channel may be provided to facilitate communication between an external environment and the first space, and the air outlet channel may be provided to facilitate communication between the first space and the mixer. The mixed gas inlet channel may be provided to facilitate communication between the mixer and the second space and the mixed gas outlet channel is provided to facilitate communication between the second space and the engine.

A guide bracket may be provided in the flow path forming case and configured to guide the mixed gas pressurized by the fan assembly towards the second outlet hole.

The guide bracket may comprise a body comprising a communication hole that is in communication with an outlet hole of the fan assembly; a fan assembly sheet provided in a circumference of the communication hole and configured to have a lower circumference of the fan assembly disposed thereon; and a first shut-off wall upwardly extended from the body and comprising a first opening formed in one lateral surface directed towards the second inlet hole.

The guide bracket may further comprise a second shut-off wall downwardly extended from the body and comprising a second opening formed in one lateral surface directed towards the second outlet hole.

The plurality of the fan assemblies may be provided in the flow path forming case and serially arranged side by side, and the mixed gas sequentially passes through the plurality of the fan assemblies.

The plurality of the fan assemblies may be spaced a preset distance apart from each other and the plurality of the guide brackets may be corresponding to the plurality of the fan assemblies. The second opening formed in one of each two neighboring guide brackets may be in communication with the first opening formed in the other one.

According to embodiments of the present disclosure, the engine drive apparatus is capable of super-charging mixed gas to an engine.

Furthermore, the engine drive apparatus is capable of radiating a motor so as to allow the air supplied to a mixer to pass a motor.

Still further, the engine drive apparatus is capable of fundamentally shutting off leakage of mixed gas towards a motor.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. A singular representation may include a plural representation unless it represents a definitely different meaning from the context.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
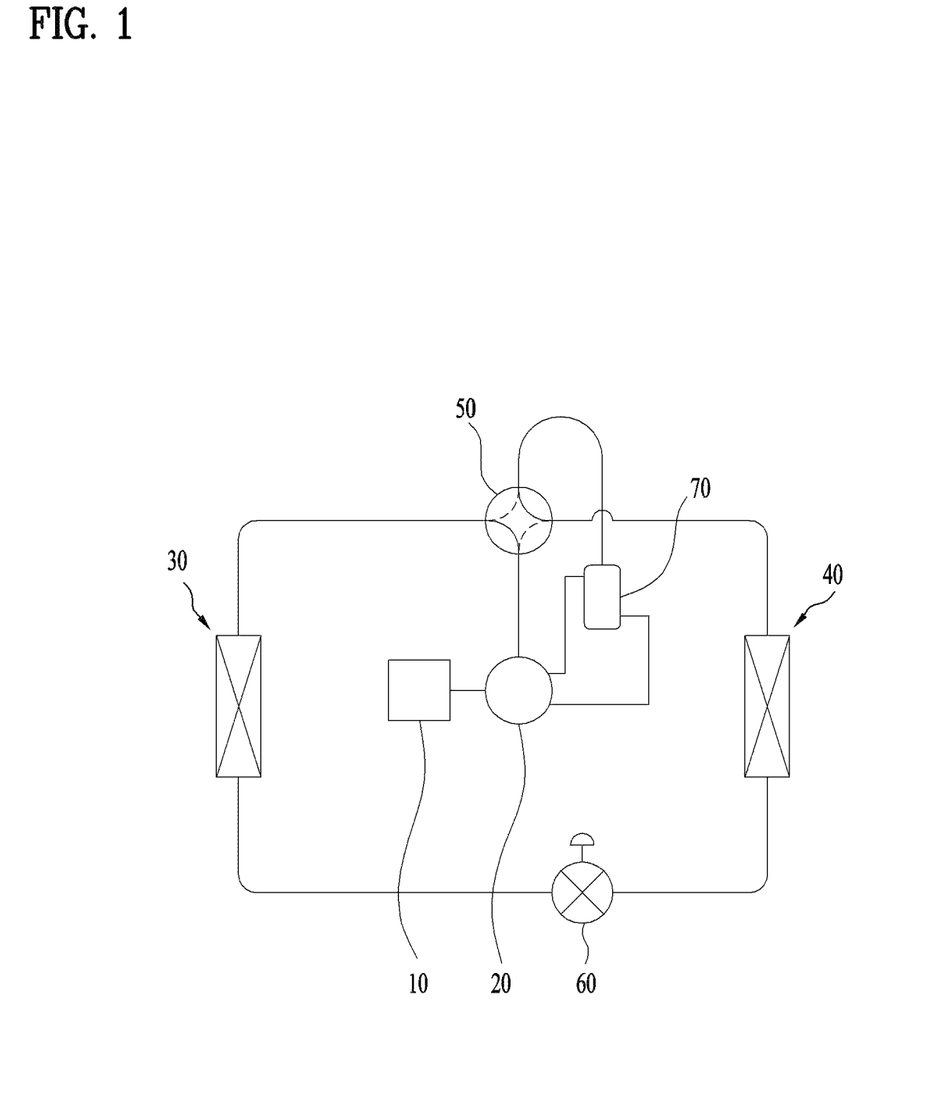
FIG. 1 is a conceptual diagram illustrating a heat pump to which an engine is applied.

FIG. 1 is a conceptual diagram illustrating a heat pump to which an engine is applied.

Referring to FIG. 1, a heat pump may include a compressor 20 which is driven by an engine 10; an indoor heat exchanger 30; and an outdoor heat exchanger 40.

The engine 10 may be driven by fuel, specifically, gas fuel (e.g., LNG). The engine may provide a power to the compressor 20. Such the engine 10 will be described in detail, referring to another drawing.

The compressor 20 may be configured to compress a refrigerant. In other words, the compressor 20 may compress a low-temperature-and-low-pressure refrigerant and form a high-temperature. One or more compressors 20 may be provided in the heat pump. A drive power for the compressor 20 may be supplied by the engine 10.

The indoor heat exchanger 30 may be configured to facilitate heat exchange between the refrigerant and indoor air. The indoor heat exchanger 30 may be actuated as an evaporator in a cooling mode of the heat pump and a condenser in a heating mode of the heat pump.

The outdoor heat exchanger 40 may be configured to facilitate heat exchange heat between the refrigerant and outdoor air. The outdoor heat exchanger 40 may be actuated as the condenser in the cooling mode of the heat pump and the evaporator in the heating mode of the heat pump.

The refrigerant discharged from the compressor 20 may be selectively guided to the indoor heat exchanger 30 or the outdoor heat exchanger 40 based on a current operation mode of the heat pump.

The heat pump may include a flow-change valve 50 provided to determine a flow direction of the refrigerant discharged from the compressor 20. In other words, the flow change valve 50 may change the flow path of the refrigerant discharged from the compressor 20 towards the indoor heat exchanger 30 or the outdoor heat exchanger 40.

The flow-change valve 50 may guide the refrigerant discharged from the compressor towards the indoor heat exchanger 30 in the heating mode and towards the outdoor heat exchanger 40 in the cooling mode.

The heat pump may further include an expansion valve 60 configured to decompress the refrigerant. The expansion valve 60 may be provided between the indoor heat exchanger 30 and the outdoor heat exchanger 40. The expansion valve 60 may expand the refrigerant drawn into one of the heat exchangers that is actuated as the evaporator. Specifically, the expansion valve 60 may be configured to expand the refrigerant that has passed one of the indoor and outdoor heat exchangers 30 and 40 that is actuated as the condenser.

The heat pump may further include an accumulator 70 configured to separate a gas-phase refrigerant and a liquid-phase refrigerant from the refrigerant drawn into the compressor 20 and then accumulate to supply only the gas-phase refrigerant to the compressor 20. The accumulator 70 may be provided in an upstream of the compressor 20. The accumulator 70 may separate only the gas-phase refrigerant from the two-phase refrigerant flowing towards the compressor 20 after vaporized in the indoor and outdoor heat exchangers 30 and 40 and guide the gas-phase refrigerant to the compressor 20.

Meanwhile, the engine mentioned above 10 may generate output by combusting a mixed gas of air and fuel. The output of the engine 10 is related with a rate of the flow of the mixed gas supplied to the engine 10 per unit time. As one example, when the flow rate of the mixed gas supplied to the engine 10 per unit time is increased, the output of the engine 10 may be increased.

Hereinafter, referring to another drawing, the flow of the air and mixed gas through the structure configured to super-charge the mixed gas towards the engine 10 (hereinafter, "a super charger") will be described.

Figure 2:
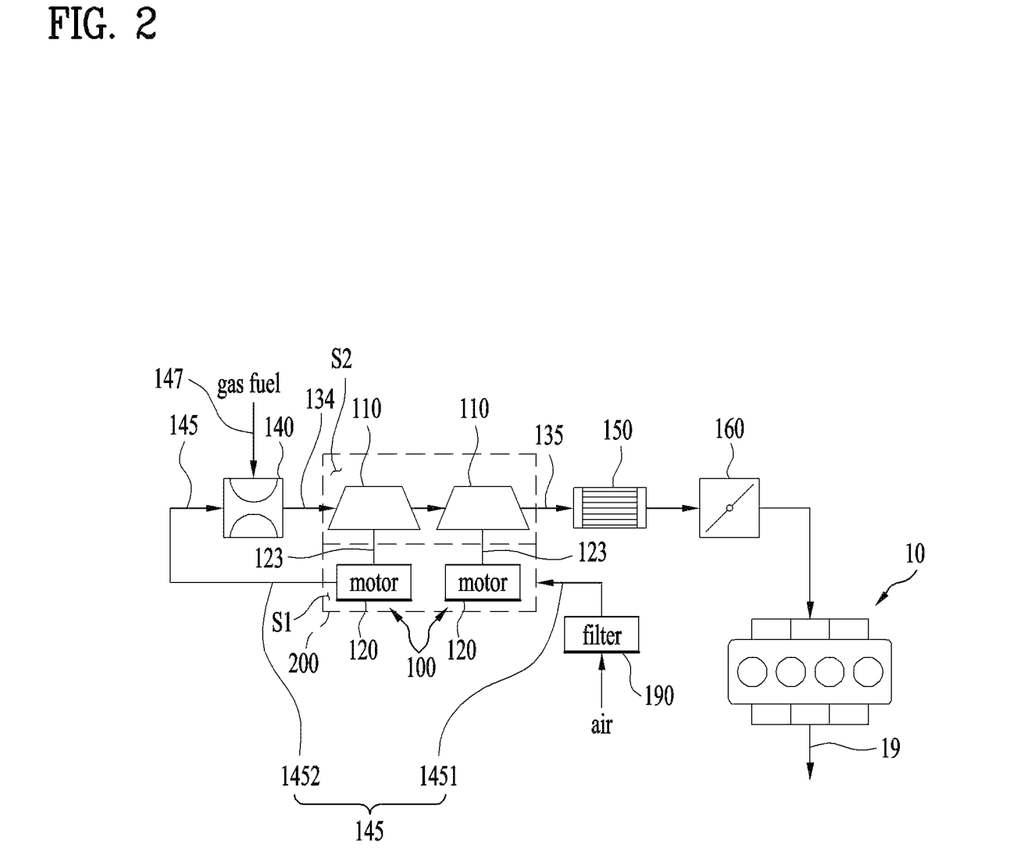
FIG. 2 is a conceptual diagram illustrating a supply flow path of mixed gas to an engine provided in an engine drive apparatus according to one embodiment.

FIG. 2 is a conceptual diagram illustrating a supply flow path of mixed gas to an engine provided in an engine drive apparatus according to one embodiment. Hereinafter, even without description, 'an upstream' of a specific element may mean a front end of the specific element and 'a downstream' of a specific element may mean a rear end of the specific element. In addition, 'fuel' may mean 'gas fuel' and examples of the gas fuel may include LNG, and 'air' may mean 'outdoor air'.

Referring to FIG. 2, the engine drive apparatus according to this embodiment may include a fan assembly 100 configured to super-charge a mixed gas of air and fuel towards the engine 10; and a mixer 140 provided in an upstream (hereinafter, a front end) of the fan assembly and configured to mix air and gas fuel.

The fan assembly 100 may be arranged in a front end of the engine 10. The mixed gas may be super-charged towards the engine 10 by the drive of the fan assembly 100. In other words, the drive of the fan assembly 100 may increase the flow of the mixed gas supplied to the engine 10 per unit time and the output of the engine 10 may be then increased.

The fan assembly 100 may include a motor 120; and a fan 100 connected to the motor 120 via a shaft 123 to drive.

The motor 120 may be driven by an external power supply and it may be controlled by a control unit not shown in the drawings. For example, 120 the motor may include a stator and a rotor that are not shown in the drawings. The other longitudinal end of the shaft 123 may be coupled to the rotor and the other longitudinal end of the shaft 123 may be coupled to the fan 110.

The motor may be driven by the external power supply such that the drive of the fan 110 may be actively performed by the motor 120.

The fan 110 driven by the motor to super-charge the mixed gas towards the engine 10 may mean a super-charger.

The mixer 140 may be configured to mix the air supplied via an air flow path 145 and the fuel supplied via a fuel flow path 147 with each other. The mixed gas of the air and fuel mixed by the mixer 140 may be guided towards the engine 10 by the fan 110 after being super-charged.

The air may be supplied to the mixer 140 via the motor 120 120. In other words, the motor 120 may be radiated while the air is passing through the motor 120.

For example, the fan assembly 100 may be provided in a flow path forming case 200. The flow path forming case 200 may include a first space S1 which accommodates the motor 120; and a second space S2 that accommodates the fan 110, portioned off from the first space S1.

The air flow path 145 may be in communication with the first space S1. The air flow path 145 may include an air inlet channel 1451 connected with an inlet of the first space S1; and an air outlet channel 1452 connected with an outlet of the first space S1.

The air supply flow path 1452 may be provided between the first space S1 and the mixer 140. A filter 190 may be provided in the air inlet channel 1451.

The air having passed the filter 190 may be drawn into the first space S1 via the air inlet channel 1451. Also, the air having passed the first space S1 may be guided to the mixer 140 through the air outlet channel 1452.

The mixed air formed by the mixer 140 may be supplied to the engine 10 through a mixed gas flow path 134 and 135 and the fan 110.

The mixed gas flow path 134 and 135 may include a mixed gas inlet channel 134 provided between the mixer 140 and the fan 110; and a mixed gas outlet channel 135 provided between the fan 110 and the engine 10.

The mixed gas inlet channel 134 may be in communication with an inlet of the second space S2 and the mixed air outlet channel 135 may be in communication with an outlet of the second space S2.

The mixed gas formed by the mixer 140 may be guided to the fan 110 through the mixed gas inlet channel 134 and the mixed gas pressurized by the fan 110 may be guided to the engine 10 through the mixed gas outlet channel 135.

An intercooler 150 configured to cool the mixed gas and a throttle valve 160 configured to control the rate of the flow of the mixed gas drawn into the engine 10 may be provided in the mixed gas outlet channel 135.

The throttle valve 160 may be provided in a rear end of the intercooler 150. In other words, the intercooler 150 and the throttle valve 160 may be sequentially provided between the fan 110 and the engine 10.

The intercooler 150 may be configured to cool the mixed gas by using air or water (in an air cooled type or a water cooled type). Once the mixed gas is cooled by the intercooler 150, the density of the mixed gas drawn into the engine 10 becomes high enough to enhance combustion efficiency.

An exhaust channel 19 configured to discharge the exhaust gas generated after combusting the mixed gas may be connected to the engine 10. The exhaust gas generated after the combustion of the mixed gas may be discharged outside the engine 10 via the exhaust channel 19.

Meanwhile, the fan 110 and the motor 120 may be connected with each other by a shaft and a bearing (not shown) may be provided around the shaft. A small gap may be formed between the fan 110 and the motor 120, considering a connection tolerance.

While the mixed gas is passing the fan 110, some of the mixed gas might leak towards the motor 102. If a spark occurs in the motor 120, the mixed gas might ignite and cause a fire.

Accordingly, it is necessary to prevent the leakage of the mixed gas towards the motor 120. Hereinafter, referring to another drawing, the structure of the fan assembly 100 configured to fundamentally prevent the leakage of the mixed gas towards the motor 120 will be described.

Figure 3:
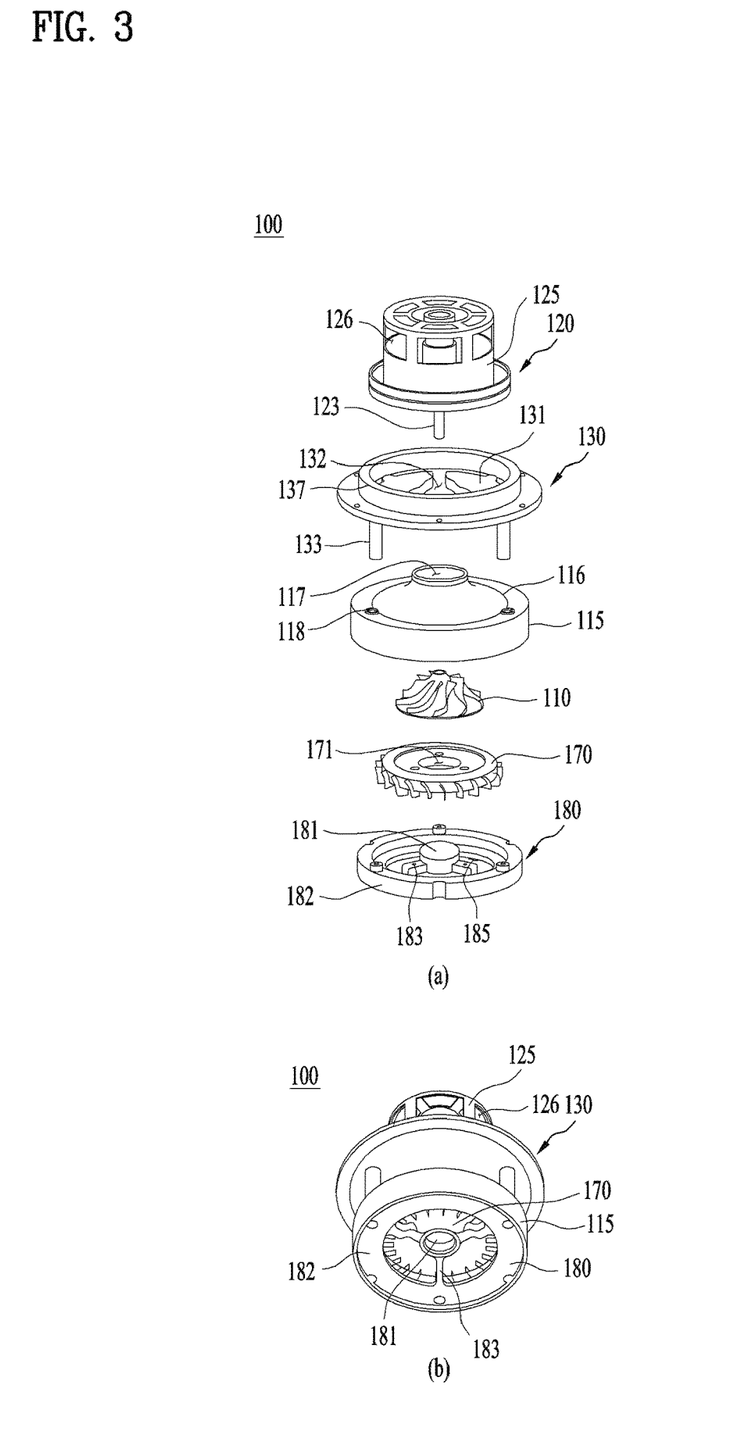
FIG. 3 is a perspective diagram of a fan assembly to super-charge the mixed gas to the engine.

FIG. 3 is a perspective diagram of a fan assembly to super-charge the mixed gas to the engine. Specifically, FIG. 3(a) is an exploded perspective diagram of the fan assembly and FIG. 3(b) is a perspective diagram illustrating a state where elements of the fan assembly are coupled to each other.

Referring to FIG. 3, the fan assembly 100 may include a fan housing 115 that accommodates the fan 110; and a support bracket 130 configured to support the motor 120.

The fan 110 may be configured of a 3D fan configured to draw the mixed gas towards the shaft and discharge the pressurized mixed gas in a perpendicular direction with respect to the shaft.

The fan housing 115 may have an open lower end. The fan 110 may be arranged in the fan housing 110 via the open lower end of the fan housing. For example, the fan housing 115 may be formed in a cylindrical shape with an open lower end.

The support bracket 130 may be supported in a state of being spaced a preset distance apart from the fan housing 115. For example, the motor 120 may be spaced apart from the fan housing 115 towards a top of the fan housing 115.

An inlet hole 117 may be formed in an upper surface 116 of the fan housing 115 and configured to draw the mixed gas. As one example, the inlet hole 117 may be formed in a center area of the upper surface 116, while facing the motor 120.

The mixed gas may be drawn into the fan housing 115 via the inlet hole 117 directed in opposite to the motor 120 and pressurized by the fan 110. Accordingly, the leakage of the mixed gas 120 towards the motor 120 may be fundamentally prevented.

The motor 120 may include a motor housing 125 for accommodating the stator and the rotor. A plurality of holes 126 may be formed in a circumference of the motor housing 125. The plurality of the holes 126 may enhance the heat radiation efficiency of the motor 120.

The support bracket 130 may include a motor sheet 131 on which the motor 120 is disposed; a shaft penetrating hole 132 penetrated by the shaft 123; and a plurality of support frames 133 configured to arrange the motor 120 spaced a preset distance apart from the fan housing 115 upwardly.

The motor sheet 131 may be formed in a corresponding shape to a lower end of the motor 120 to support the lower end. Specifically, the motor sheet 131 may be formed to support the lower end of the motor housing 125. As one example, the motor sheet 131 and the lower end of the motor housing 125 may be circular-shaped.

The circumference of the motor sheet 131 may be partitioned off by a motor sheet lateral wall 137. The motor sheet lateral wall 137 may be projected from the motor sheet 131 towards the motor 120.

The shaft penetrating hole 132 may be formed through the support bracket 130 vertically. As one example, the shaft penetrating hole 132 penetrates from the center area of the motor sheet 131 in a vertical direction.

The plurality of the support frames 133 may be extended from the support bracket 130 downwardly and spaced a preset angle apart along a circumference of the support bracket 130.

A lower end of each support frame 133 may be coupled to the upper surface 115 of the fan housing 115. Specifically, a plurality of coupling grooves 118 may be formed in the upper surface 116 of the fan housing 115, corresponding to the plurality of the support frames 133, respectively. In other words, the plurality of the coupling grooves 118 may be formed in an outer area of the supper surface 116 in a radial direction with respect to the shaft penetrating hole 132.

Accordingly, the motor sheet 131 and the upper surface 116 of the fan housing 115 are vertically spaced apart from each other such that the mixed gas can be smoothly drawn into the fan housing 115 via the inlet hole 117. In addition, the flow of the mixed gas towards the motor 120 may be fundamentally prevented.

The fan assembly 100 may further include a diffuser 170 arranged in a lower end of the fan 110; and a lower bracket 180 formed to support a lower end of the diffuser 170.

The diffuser 170 may include a plurality of blades formed in an outer circumference and it may be configured to lower the speed of the mixed gas pressurized by the fan 110 and raising the pressure. The diffuser 170 is well-known and detailed description thereof will be omitted accordingly.

The lower bracket 180 may be arranged under the diffuser 170 to have the diffuser 170 disposed thereon. An outlet hole 185 may be formed in the lower bracket 180 and configured to discharge the mixed gas pressurized by the fan 110. The plurality of the outlet holes 185 may be formed through the lower bracket 180 in a vertical direction.

Accordingly, the mixed gas may be drawn into the fan housing 115 via the inlet hole 117 and pressurized by the fan 110. The pressurized mixed gas may be discharged outside the fan assembly 100 via the outlet hole 185, after sequentially passing an inner circumferential surface of the fan housing 115 and the diffuser 170.

The lower bracket 180 may include a diffuser coupling portion 181 upwardly projected from a center area; and a plurality of ribs 183 extended from the diffuser coupling portion 181 towards the housing coupling portion 182.

The diffuser coupling portion 181 may be upwardly projected to couple a diffuser hole 181 formed in a center area of the diffuser 170. The lower bracket 180 may be arranged in the lower end of the diffuser 170 in a state where the diffuser coupling portion 181 is insertedly fitted in the diffuser hole 181.

The housing coupling portion 182 may form the circumference of the lower bracket 180. As one example, the housing coupling portion 182 may be formed in a ring shape. In other words, the housing coupling portion 182 may be spaced apart from the diffuser coupling portion 181 in a radial direction.

The plurality of the ribs 183 may be extended from the diffuser coupling portion 181 towards the housing coupling portion 182. The plurality of the ribs 183 may be spaced a preset angle apart from each other. The outlet hole 185 may be defined by the plurality of the ribs 183.

Specifically, the diffuser coupling portion 181, the housing coupling portion 182 and the plurality of the ribs 183 may define the plurality of the outlet holes 184.

When the motor 120 is driven, the mixed gas may be drawn into the fan housing 115 via the inlet hole 117 in a direction that gets farther from the motor 120 and then pressurized by the fan 110, only to be discharged via the outlet hole 185. Accordingly, the leakage of the mixed gas towards the motor 120 may be fundamentally prevented.

Meanwhile, to prevent the leakage of the mixed gas towards the motor 120 and radiate the motor 120 simultaneously, it is necessary to separate a flow path of air and a flow path of the mixed gas from each other by using the flow path forming case 200 mentioned above.

Hereinafter, referring to other drawings, the above-noted flow path forming case 200 configured to accommodate the fan assembly 100 will be described in detail.

Figure 4:
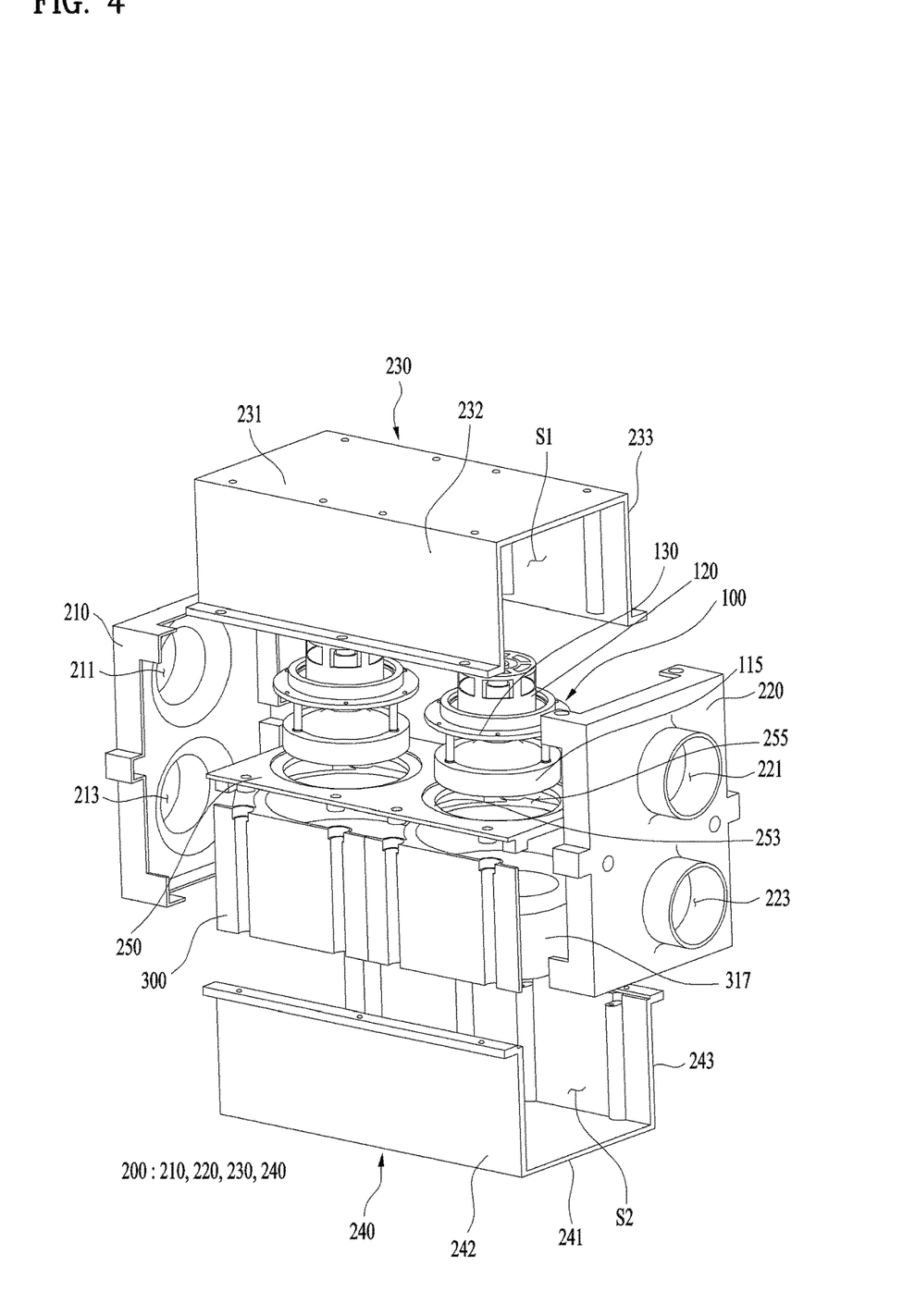
FIG. 4 is a perspective diagram illustrating a connecting relation between the fan assembly and a flow path forming case configured to form flow paths of the air and mixed gas, which passes the fan assembly.

FIG. 4 is a perspective diagram illustrating a connecting relation between the fan assembly and a flow path forming case configured to form flow paths of the air and mixed gas, which passes the fan assembly.

Referring to FIGS. 2 and 4, the embodiment of the present disclosure may further include the flow path forming case 200 that accommodates the fan assembly 100 described above. The flow path forming case 200 may be in communication with the air flow path 145 and the mixed gas flow path 134 and 135 mentioned above (see FIG. 2).

Specifically, the flow path forming case 200 may have two spaces. As one example, the flow path forming case 200 may include a first space S1 defined in an upper area; and a second space S2 defined in a lower area. In other words, the second space S2 may be formed independent from the first space S1.

The first space S1 may be in communication with the air flow path 145. The second space S2 may be in communication with the mixed gas flow path 134 and 135.

When the fan assembly 100 is arranged in the flow path forming case 200, the motor 120 may be arranged in the first space S1 and the fan 110 may be arranged in the second space S2. In other words, the motor housing 125 may be arranged in the first space S1 and the fan housing 115 may be arranged in the second space S2.

Accordingly, the motor 120 may be radiated by the air drawn into the first space S1 via the air flow path 145. Also, the mixed gas drawn into the second space S2 via the mixed gas flow path 134 and 135 may be pressurized by the fan 110.

A separation plate 250 may be provided in the flow path forming case 200 to partition off an internal space into the first space S1 and the second space S2. The first space S1 may be arranged in an upper area and the second space S2 may be arranged in a lower area with respect to the separation plate 250.

A support bracket sheet 253 may be provided in the separation plate 250 and the circumference of the support bracket 130 mentioned above may be disposed on the support bracket sheet 253. The support bracket sheet 253 may be concavely formed and a back side of the circumference of the support bracket 130 may be sealed and supported to a top surface of the support bracket sheet 153.

In addition, a separation hole 255 may be formed in the separation plate 250 and the fan housing 115 may penetrate the separation hole 255 downwardly.

Accordingly, the motor 120 may be arranged in the first space S1 and the fan housing 115 may be arranged in the second space S2.

Specifically, the flow path forming case 200 may include a first side case 210 and a second side case 220 that are configured to define both side surfaces. In addition, the flow path forming case 200 may further include an upper case 230 configured to define a top surface and some area of front and rear surfaces; and a lower case 240 configured to define a bottom surface and the other area of the front and rear surfaces.

In the illustrated embodiment, the first side case 210 may define a left side of the flow path forming case 200 and the second side case 220 may define a right side of the flow path forming case 200.

A first inlet hole 211 corresponding to the first space S1 may be formed in the first side case 210 and a first outlet hole 221 facing the first inlet hole 211 and corresponding to the first space S1 may be formed in the second side case 220.

A second inlet hole 223 corresponding to the second space S2 may be further formed in the second side case 220. A second outlet hole 213 facing the second inlet hole 223 and corresponding to the second space S2 may be further formed in the first side case 210.

The first inlet hole 211 may be formed higher than the second outlet hole 213 and the first outlet hole 221 may be formed higher than the second inlet hole 223.

In other words, the first inlet hole 211 in communication with the first space S1 and the second outlet hole 213 in communication with the second space S2 and formed below the first inlet hole 211 may be formed in the first side case 210.

The first outlet hole 221 in communication with the first space S1 and the second inlet hole 223 in communication with the second space S2 and formed below the first inlet hole 221 may be formed in the second side case 220.

The air drawn into the first space S1 via the first inlet hole 211 may radiate the motor 120 and be then discharged outside the first space S1 via the first outlet hole 221. The mixed gas drawn into the second space S2 via the second inlet hole 223 may be pressurized by the fan 110 and then discharged outside the second space S2 via the second outlet hole 213.

Specifically, the air inlet channel 1451 described referring to FIG. 2 may be connected with the first inlet hole 211 and the air outlet channel 1452 may be connected with the first outlet hole 221. Accordingly, the air inlet channel 1451 and the air outlet channel 1452 may be in communication with the first space S1.

In other words, the air inlet channel 1451 may facilitate the communication between the first space S1 and the external environment. The air outlet channel 1452 may facilitate the communication between the first space S1 and the mixer 140 (e.g., an air inlet hole of the mixer).

The mixed gas inlet channel 134 may be connected with the first inlet hole 223 and the mixed gas outlet channel 135 may be connected with the second outlet hole 213. Accordingly, the mixed gas inlet channel 134 and the mixed gas outlet channel 135 may be in communication with the second space S2.

In other words, the mixed gas inlet channel 134 may be provided to facilitate the communication between the mixer 140 (e.g., the mixed gas outlet hole of the mixer) and the second space S2. The mixed gas outlet channel 135 may be provided to facilitate the communication between the second space S2 and the engine 10.

The upper case 230 may include an upper surface 231; and an upper front surface 232 and an upper rear surface 233 that are downwardly extended from the upper surface 231. The lower case 240 may include a lower surface 241; and a lower front surface 242 and a lower rear surface 243 that are upwardly extended from the lower surface 241.

Once the upper case 230 and the lower case 240 are coupled to each other, the first side case 210 and the second side case 220 may be coupled to both side surfaces of the coupled upper and lower cases 230 and 240.

The first space S1 may be defined by the upper case 230, the separation plate 250 and the first and second side cases 210 and 220. The second space S2 may be defined by the lower case 240, the separation plate 250 and the first and second side cases 210 and 220.

The plurality of the fan assemblies 100 may be provided in the flow path forming case 200. At this time, the fan assemblies 100 may be serially arranged side by side. In other words, the mixed gas may sequentially pass through the fan assemblies 100.

In this instance, the plurality of the fan assemblies 100 may be spaced a preset distance apart from each other in a longitudinal direction of the flow path forming case 200. A plurality of separation holes 255 corresponding to the plurality of the fan assemblies 100 may be provided in the separation plate 250, spaced apart from each other. The support bracket sheet 253 may be provided in an circumference of each separation hole 255.

Meanwhile, the mixed gas drawn into the second space S2 via the second inlet hole 223 may penetrate the inlet hole 117 formed in the fan housing 115 and exhaust via the second outlet hole 213.

To guide the flow of the mixed gas in such the flow path forming case 200, a guide bracket 300 may be further provided according to the present disclosure. Hereinafter, referring to other drawings, the guide bracket 300 will be described in detail.

Figure 5:
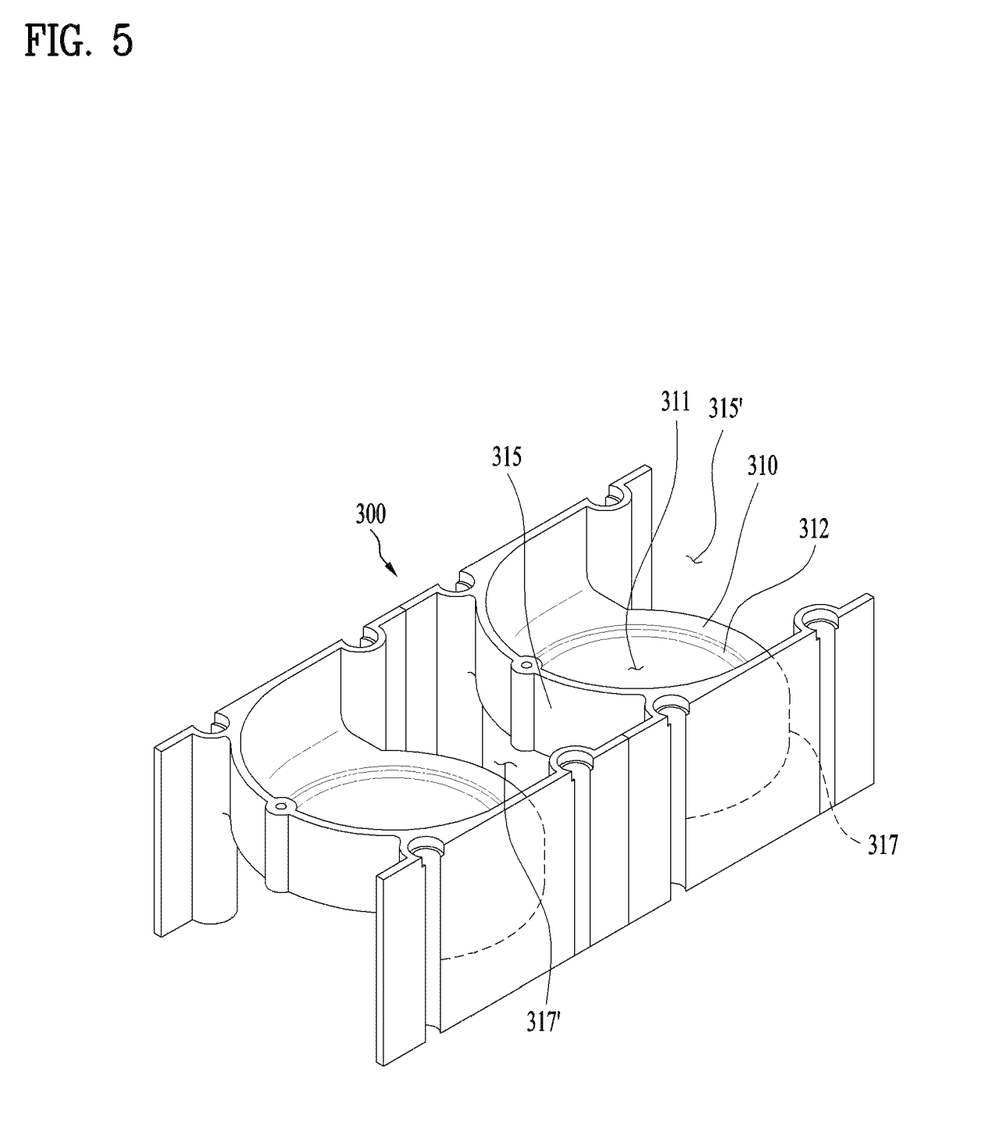
FIG. 5 is a perspective diagram illustrating a guide bracket provided in the flow path forming case and configured to guide the flow of the mixed gas.

FIG. 5 is a perspective diagram illustrating a guide bracket provided in the flow path forming case and configured to guide the flow of the mixed gas.

Referring to FIGS. 4 and 5, the guide bracket 300 may be formed to support a lower end of the fan assembly 100 mentioned above. In other words, the lower end of the fan assembly 100 may be disposed on the guide bracket 300.

The guide bracket 300 may be configured to guide the mixed gas pressurized by the fan assembly 100 towards the second outlet hole 213.

Specifically, the guide bracket 300 may include a body 310 having a communication hole 311 formed therein; a fan assembly sheet 312 provided in a circumference of the communication hole 311; and a first shut-off wall 315 extended from the body 310 upwardly.

The body 310 may be formed in a circular shape and the communication hole 311 may be formed in a center area of the body 310 in a vertical direction. The communication hole 311 may be corresponding to the outlet hole 185 of the fan assembly 100 mentioned above.

The fan assembly sheet 312 may be provided in a circumferential area of the communication hole 311 formed in an upper surface of the body 310. The fan assembly sheet 312 may be formed corresponding to a circumference of the lower end of the fan assembly 100. In other words, the fan assembly sheet 312 may be corresponding to a lower circumference of the fan housing 115.

Accordingly, the lower end of the fan assembly 100 may be supported by the fan assembly sheet 312. Specifically, the lower end of the fan housing 115 may be disposed on the fan assembly sheet 312.

The first shut-off wall 315 may be upwardly extended from the body 310. Specifically, the first shut-off wall 315 may be upwardly extended from a top surface of the body 310 towards the separation plate 250. An upper end of the first shut-off wall 315 may be in contact with a bottom surface of the separation plate 250.

Furthermore, a first opening 315' may be provided in a lateral surface of the first shut-off wall 315 that is directed towards the second inlet hole 223. In other words, the first opening 315' may face the second inlet hole 223 and communicate with the second inlet hole 223.

As one example, the first shut-off wall 315 may be extended along some area of the circumference of the body 310. Specifically, the first shut-off wall 315 may be extended along the other area of the circumference of the body 310, except the first opening 315'. The lateral surface of the first shut-off wall 315 that is directed towards the second inlet hole 223 maybe cut away to form the first opening 315'.

A lateral surface of the body 310 that is directed towards the second outlet hole 213 in an upper space of the body 310 may be shut off by the first shut-off wall 315. The first shut-off wall 315 may shut off the upper space of the body 310 from the second outlet hole 213.

Accordingly, all of the mixed gas discharged from the fan assembly 100 may be guided along a downward direction by the communication hole 311.

The mixed gas having penetrated the communication hole 311 has to be guided to the second outlet hole 213 mentioned above. The guide bracket 300 may further include a second shut-off wall 317 downwardly extended from the body 310.

The second shut-off wall 317 may be downwardly extended from the body 310. Specifically, the second shut-off wall 317 may be downwardly extended from a lower surface of the body 310 towards the lower surface 241 of the lower case 240 mentioned above. The lower end of the second shut-off wall 317 may be in contact with the lower surface 241 of the lower case 240.

In addition, a second opening 317' may be provided in a lateral surface of the second shut-off wall 317 that is directed towards the second outlet hole 213. Specifically, may face the second outlet hole 213 and communicate with the second outlet hole 213.

As one example, the second shut-off wall 317 may be extended along some area of the circumference of the body 310. Specifically, the second shut-off wall 317 may be extended along the other area of the circumference of the body 310, except the second opening 317'. The lateral surface of the second shut-off wall 317 that is directed towards the second outlet hole 213 maybe cut away to form the second opening 317'.

A lateral surface of the body 310 that is directed towards the second inlet hole 223 in a lower space of the body 310 may be shut off by the second shut-off wall 31. The second shut-off wall 317 may shut off the lower space of the body 310 from the second inlet hole 223.

Accordingly, all of the mixed gas discharged from the fan assembly 100 may be guided towards the second outlet hole 213.

When the plurality of the fan assemblies 100 is provided in the flow path forming case 200, the plurality of the guide brackets 300 may be provided, corresponding to the plurality of the fan assemblies 100.

The plurality of the guide brackets 300 may be arranged side by side and integrally formed with each other. As one example, the first shut-off wall 315 provided in each two neighboring guide brackets 300 may be connected with each other. As one example, both ends of one shut-off wall 315 provided in one of each two neighboring guide brackets 300 may be extended towards both ends of the other shut-off wall 315.

At this time, when the plurality of the guide brackets 300 is provided, each of the guide brackets 300 may include the body 310 mentioned above. At this time, one second opening 317' formed in one of each two neighboring guide brackets 300 may communicate with the other first opening 315'.

Accordingly, the mixed gas drawn into the flow path forming case 200 may pass through the fan assemblies 100 sequentially to be discharged outside the flow path forming case 200.

Hereinafter, referring to other drawings, the overall flow paths of the air and mixed gas passing through the flow path forming case will be described.

Figure 6:
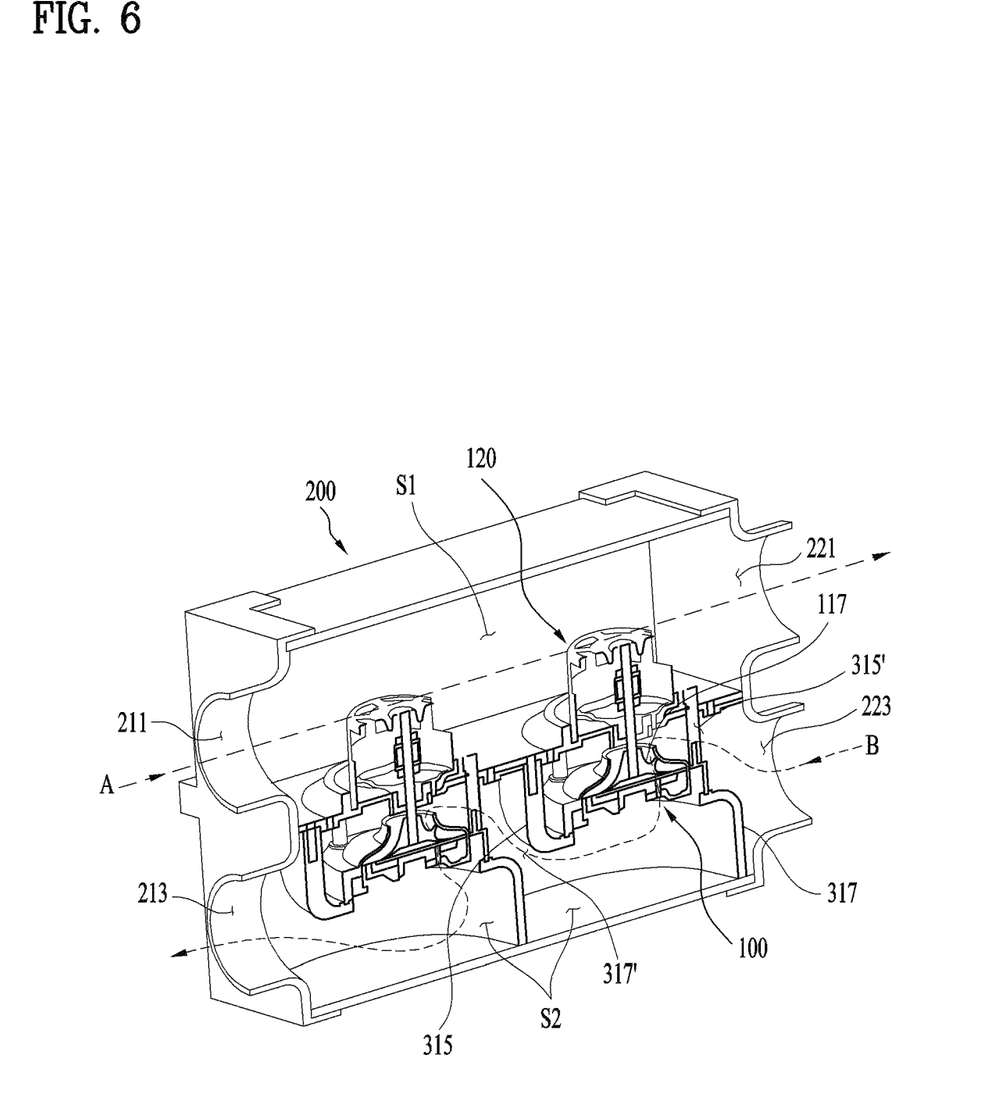
FIG. 6 is a sectional diagram illustrating a state where the fan assembly and the guide bracket are coupled to each other in the flow path forming case.

FIG. 6 is a sectional diagram illustrating a state where the fan assembly and the guide bracket are coupled to each other in the flow path forming case.

Referring to FIG. 6, as shown in an arrow of 'A', the air may be drawn into the first space S1 of the flow path forming case 200 via the first inlet hoe 211. The air drawn into the first space S1 is able to radiate the motor 120, while passing through the motor 120 arranged in the first space S1.

The air having passed through the motor 120 in the first space S1 may be discharged outside the flow path forming case 200 via the first outlet hole 221 facing the first inlet hole 211. The discharged air may be guided to the mixer 140 mentioned above.

As shown in an arrow of 'B', the mixed gas formed by the mixer 140 may be drawn into the second space S2 provided in the flow path forming case 200 via the second inlet hoe 223. The mixed gas drawn into the second space S2 may be guided to the inlet hole 117 of the fan assembly 100 (that is, the inlet hole of the fan housing 115) via the first opening 315' provided in the guide bracket.

In this instance, the first shut-off wall 315 provided in the guide bracket may shut off the mixed gas from flowing towards the second outlet hole 213, not flowing into the inlet hole 117. In other words, all of the mixed gas may be drawn into the inlet hole 117 may be drawn into the inlet hole 117 by the first shut-off wall 315.

The mixed gas pressurized by the fan provided in the fan assembly 100 may be exhausted to the lower end of the fan assembly 100 and guided to the lower space of the body 310 via the communication hole 311 formed in the body 310 of the guide bracket 300.

The mixed gas guided to the lower space of the body 310 may be guided towards the second outlet hole 213 via the second opening 317' provided in the guide bracket.

At this time, the second shut-off wall 317 provided in the guide bracket may shut off the mixed gas from flowing towards the second inlet hole 223, without flowing towards the second outlet hole 213. In other words, the second shut-off wall 317 may allow the mixed gas to flow towards the second outlet hole 213.

When the plurality of the fan assemblies 100 is provided, the mixed gas guided into the lower space of the body 300 may be guided to the first opening 315' provided in the neighboring guide bracket via the second opening 317'.

In other words, when the plurality of the fan assemblies 100 is provided, the mixed gas may sequentially pass through the plurality of the fan assemblies 100 and exhaust outside the flow path forming case 200 via the second outlet hole 213.

Meanwhile, although not shown in the drawings, the engine drive apparatus according to the present disclosure may be applicable to an engine generation system. Specifically, the engine generation system may mean a device or system which drives a generator by using an engine 10.

In the engine generation system, the engine 10 may be configured to provide a power to the generator. The engine 10 and the generator may be coaxially connected with each other or they may be connected with each other by using a belt and a pulley. When the drive power of the engine 10 is supplied to the generator, the generator may be driven.

As described above, the engine drive apparatus according to the present disclosure may prevent a fire that might be caused by the leakage of the mixed gas to the motor configured to super-charge the mixed gas to the engine. The engine drive apparatus may be equally applied to the heat pump and the engine generation system that include the engine.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An engine drive apparatus comprising:
    an engine configured to generate a power by combusting mixed gas of air and gas fuel;
    a fan assembly arranged in an upstream of the engine and configured to super-charge the mixed gas towards the engine; and
    a mixer provided in an upstream of the fan assembly and configured to mix the air and the fuel with each other,
    wherein the fan assembly comprises
    a motor; and
    a fan connected with the motor via a shaft to drive, and the air is supplied to the mixer after passing through the motor.

2. The engine drive apparatus of claim 1, wherein the fan assembly comprises
    a fan housing provided to accommodate the fan inside and having an open lower end; and
    a support bracket configured to support the motor in the upper area of the fan housing, space a apart from the fan housing,
    an inlet hole is formed in an upper end surface of the fan housing and configured to draw the mixed gas formed by the mixer towards the fan.

3. The engine drive apparatus of claim 2, wherein the support bracket comprises,
    a motor sheet on which the motor is disposed;
    a shaft penetrating hole formed in the motor sheet and configured to pass the shaft there through; and
    a plurality of support frames configured to support the motor sheet in a state of being spaced apart from the inlet hole, and
    lower ends of the support frames are coupled to coupling grooves that are formed in an outer area of an upper surface of the fan housing with respect to a radial direction of the inlet hole, respectively.

4. The engine drive apparatus of claim 2, wherein the fan assembly comprises,
   a diffuser arranged in a lower end of the fan; and
   a lower bracket arranged under the diffuser to have the diffuser disposed thereon and coupled to a lower end of the fan housing, and
   an outlet hole configured to discharge the mixed gas pressurized by the fan is formed in the lower bracket.

5. The engine drive apparatus of claim 4, wherein the lower bracket comprises,
   a diffuser coupling portion upwardly projected from a center area to couple the diffuser;
   a housing coupling portion configured to form a circumference of the lower bracket and coupled to a lower end of the fan housing; and
   a plurality of ribs radially extended from the diffuser coupling portion towards the housing coupling portion to define the outlet hole.

6. The engine drive apparatus of claim 4, wherein when the motor is driven, the mixed gas is drawn via the inlet hole in a direction that becomes farther from the motor, and the mixed gas is then pressurized by the fan and discharged via the outlet hole.

7. The engine drive apparatus of claim 2, further comprising:
   an air flow path configured to guide air towards the mixer;
   a mixed air flow path configured to guide the mixed gas towards the engine; and
   a flow path forming case comprising a first space in communication with the air flow path; and a second space independent from the first space and in communication with the mixed gas flow path,
   wherein the motor is arranged in the first space and the fan housing is arranged in the second space.

8. The engine drive apparatus of claim 7, wherein a separation plate is provided in the flow path forming case and configured to partition off an internal space into the first space provided in an upper space and the second space provided in a lower space, and
   a support bracket sheet is provided in the separation plate and a circumference of the support bracket is disposed on the support bracket sheet.

9. The engine drive apparatus of claim 8, wherein the flow path forming case comprises,
   first and second side cases configured to define both lateral surfaces;
   an upper case configured to define some areas of the upper, front and rear surfaces; and
   a lower case configured to define the other area of the upper, front and rear surfaces, and
   a first inlet hole corresponding to the first space and a second outlet hole corresponding to the second space are formed in the first side case, and
   a first outlet hole corresponding to the first space and a first inlet hole corresponding to the second space are formed in the second side case.

10. The engine drive apparatus of claim 9, wherein the air flow path comprises an air inlet channel connected with the first inlet hole; and an air outlet channel connected with the first outlet hole, and
    the mixed gas flow path comprises a mixed gas inlet channel connected with the second inlet hole; and a mixed gas outlet channel connected with the second outlet hole.

11. The engine drive apparatus of claim 10, wherein the air inlet channel is provided to facilitate communication between an external environment and the first space, and
    the air outlet channel is provided to facilitate communication between the first space and the mixer, and
    the mixed gas inlet channel is provided to facilitate communication between the mixer and the second space and the mixed gas outlet channel is provided to facilitate communication between the second space and the engine.

12. The engine drive apparatus of claim 9, wherein a guide bracket is provided in the flow path forming case and supporting a lower end of the fan assembly and configured to guide the mixed gas pressurized by the fan assembly towards the second outlet hole.

13. The engine drive apparatus of claim 12, wherein the guide bracket comprises,
    a body comprising a communication hole that is in communication with an outlet hole of the fan assembly;
    a fan assembly sheet provided in a circumference of the communication hole and configured to have a lower circumference of the fan assembly disposed thereon; and
    a first shut-off wall upwardly extended from the body and comprising a first opening formed in one lateral surface directed towards the second inlet hole.

14. The engine drive apparatus of claim 13, wherein the guide bracket further comprises,
    a second shut-off wall downwardly extended from the body and comprising a second opening formed in one lateral surface directed towards the second outlet hole.

15. The engine drive apparatus of claim 14, wherein the plurality of the fan assemblies are provided in the flow path forming case and serially arranged side by side, and
    the mixed gas sequentially passes through the plurality of the fan assemblies.

16. The engine drive apparatus of claim 15, wherein the plurality of the fan assemblies are spaced apart from each other and the plurality of the guide brackets are corresponding to the plurality of the fan assemblies, and
    the second opening formed in one of each two neighboring guide brackets is in communication with the first opening formed in the other one.

* * * * *